Sept. 12, 1950 W. H. FORSTER 2,522,110

PULSE DETECTOR SYSTEM

Filed Dec. 21, 1944 2 Sheets-Sheet 1

INVENTOR.
William H. Forster
BY Darby + Darby
ATTORNEYS.

Sept. 12, 1950

W. H. FORSTER 2,522,110

PULSE DETECTOR SYSTEM

Filed Dec. 21, 1944

2 Sheets-Sheet 2

INVENTOR.
William H. Forster

BY Darby & Darby

ATTORNEYS.

Patented Sept. 12, 1950 2,522,110

UNITED STATES PATENT OFFICE 2,522,110

PULSE DETECTOR SYSTEM

William H. Forster, Philadelphia, Pa., assignor, by mesne assignments, to Philco Corporation, Philadelphia, Pa., a corporation of Pennsylvania Application December 21, 1944, Serial No. 569,142

7 Claims. (Cl. 250—27)

The present invention relates to electrical apparatus and particularly to a radio receiver. More particularly still the invention relates to an improved detector system for the reception of pulse repetition frequency modulated signals.

The system of the instant invention, in its preferred embodiment, utilizes a non-oscillating multivibrator as an important element of the detector and combines therewith a pulse width discriminator.

In my present invention the received signal is applied to a limiter and the output thereof is passed through a pulse width discriminator, thereby reducing pulse interference, after which the output of the discriminator is applied to a multivibrator and causes firing thereof. The output pulse of the multivibrator is integrated, the resultant output from the integrator being a sawtooth wave form containing the original modulation, which is thereafter separated from other components by a low pass filter leaving only the audio signal.

As will be clear from the above, it is perhaps more proper to term the detector one of pulse intervals rather than a pulse repetition frequency detector since the peak amplitude of the sawtooth wave to which the audio signal is proportional is, in reality, a linear function of the interval between successive pulses. However, for the purposes of this description, it is believed sufficiently accurate to speak of the detector as a pulse repetition frequency detector.

As illustrative of the situation mentioned in the preceding paragraph, a 10 kc. pulse repetition frequency with a 2 kc. deviation plus or minus will change the intervals between pulses from 100 microseconds, center frequency, down to 83 microseconds and up to 125 microseconds. As an approximation, this results in about 20% second harmonic distortion. A 10% deviation from the center frequency will give about 10% distortion. In any event, the modulation is linearly proportional to the modulating signal insofar as frequency is concerned.

Furthermore, there is no inherent distortion in the detector if the transmitter is suitably modulated. Thus, if the transmitter utilizes a hypothetical tube with a characteristic approaching an hyperbola, the output of the detector will be distortionless.

The present system was primarily designed for military communications and in the system, therefore, a distortion of from 10 to 20% is without significance.

It is an object of the present invention to provide an efficient detector for pulse repetition frequency modulated signals.

It is another object of the invention to provide such a detector in which means are provided for eliminating pulse interferences.

It is a further object of the invention to provide such a detector having a high signal-to-noise ratio.

Other objects and features of the invention will appear when the following description is considered in connection with the appended drawings in which—

Figure 1:
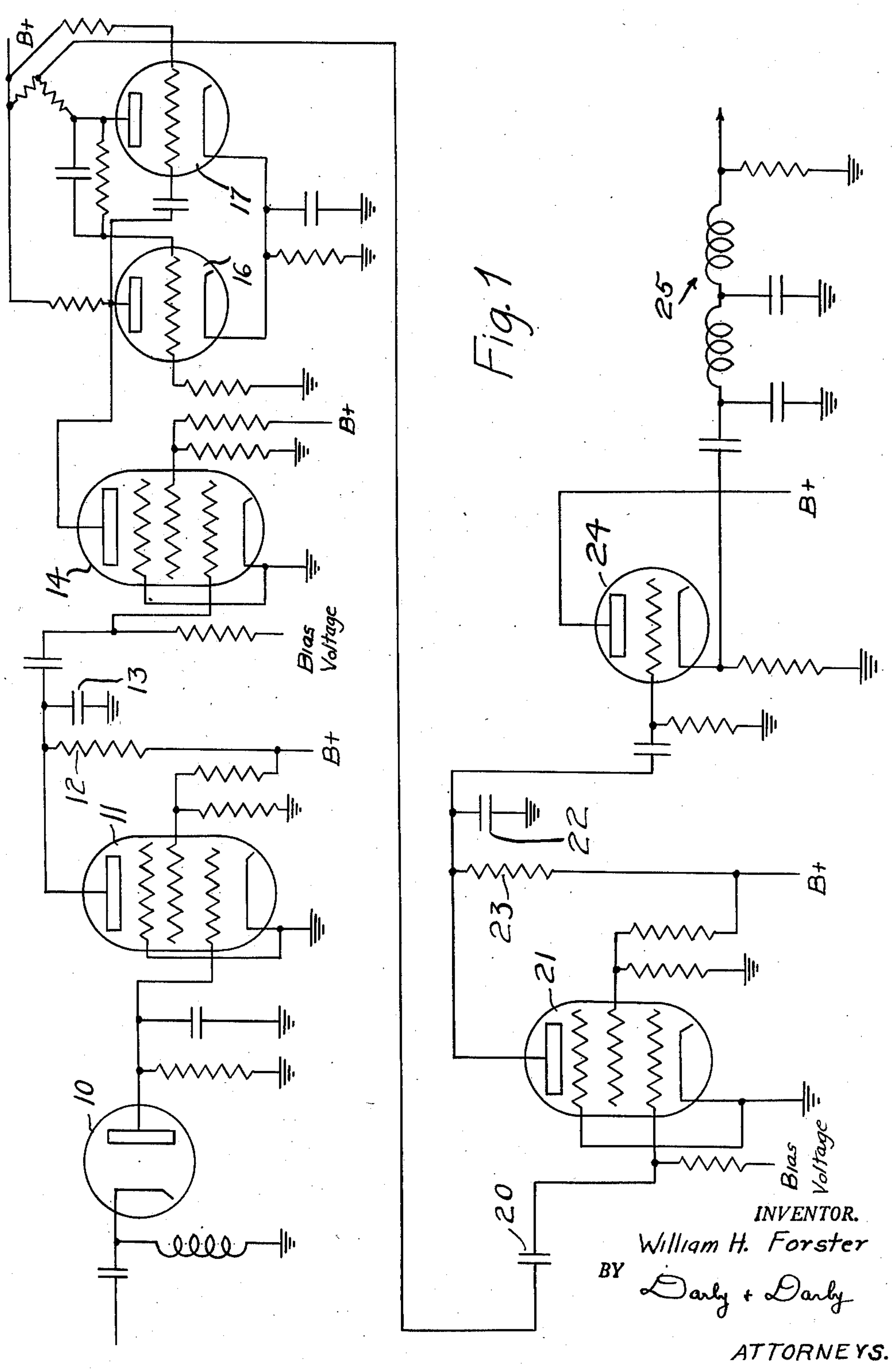
Figure 1 is a schematic diagram of the detector system of my invention.
Figure 2:
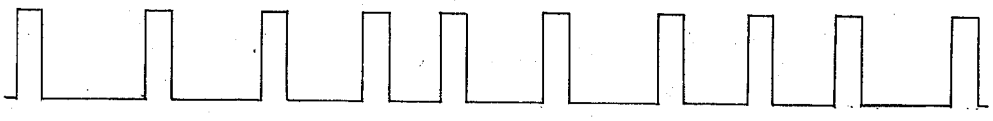
Figure 2 is a curve showing the transmitted signal.

Referring now to Figure 1, there is shown therein at 10 a diode detector which follows the last intermediate frequency amplifier stage and applies pulses to the control grid of the pentode 11 which pentode serves as a limiter in its grid circuit and as an integrator in its plate circuit. The plate circuit time constant (i. e. the values of the resistance 12 and capacity 13) are so adjusted in connection with the following pentode 14 that when the transmitted pulses are of a length of three microseconds and the mean interval between pulses 100 microseconds, an interfering pulse of overload amplitude will not integrate to a sufficient voltage to cause the pentode 14, which is a pick-off tube, to draw current.

Figure 3:
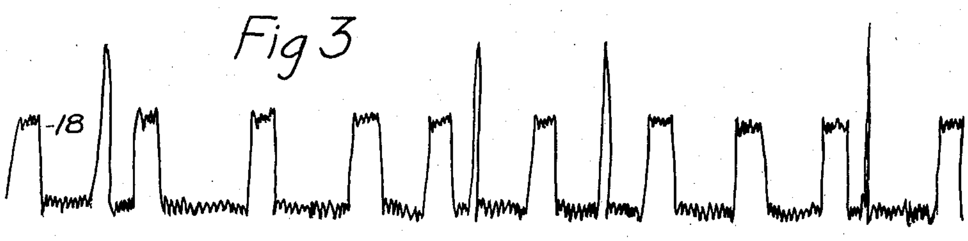
Figure 3 is a curve showing the video frequency signal input to the limiter stage of the detector system.
Figure 4:
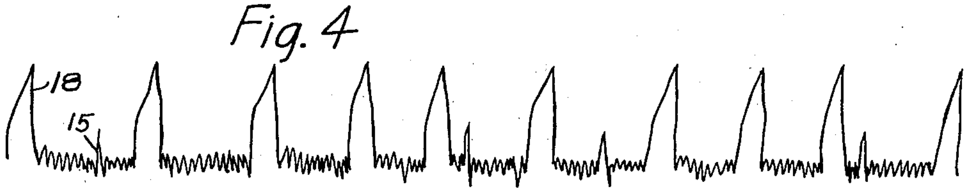
Figure 4 is a voltage curve showing the output of the limiter as modified by the discriminator action thereof.

Referring to Figure 3, it will be seen that the input to the pentode 11 contains interfering pulses such as those designated 15 which are eliminated in the output of the limiter by virtue of the time constant adjustment of resistance 12 and capacity 13 as above described. The output of the limiter is shown in Figure 4 and the interfering pulses 15 as may be seen by reference to that figure are much reduced in value.

The output of the pentode 14 is applied to a multibrator comprising tubes 16 and 17. The multivibrator is of normal type and is adjusted to be non-oscillating. Therefore when a signal pulse such as indicated at 18 in Figure 4 is applied to the multivibrator, it goes through a single cycle and produces in its plate circuit a square topped impulse such as indicated at 19 in Figure 5. These impulses are applied through the capacity coupling 20 to the pentode 21 which pentode is biased beyond the cut-off point. The application of the wave of Figure 5 to the input grid of the pentode 21 causes this pentode to be operated alternately above and below plate current cut-off values. Thus during the period of an impulse such as 19 the plate resistance of the pentode 21 is very low and any charge which may have accumulated in the plate circuit capacity, including the capacity of the tube itself as well as the capacity of the shunted condenser 22, or in some instances the inherent internal capacity of tube 21 alone, will leak off to ground through the pentode.

Figure 5:
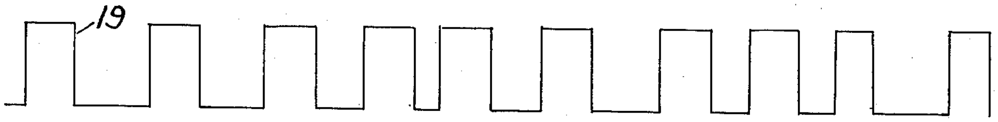
Figure 5 is a voltage curve showing the ouput signal from the multivibrator.
Figure 6:
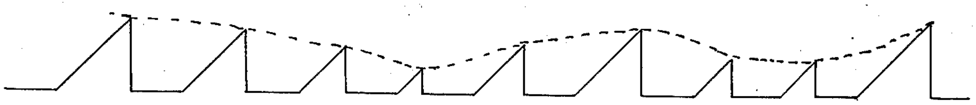
Figure 6 is a voltage curve showing the output signal from the integrator tube and in dashed line the audio output of the system.

During the remainder of the cycle, that is during the interval between pulses 19 of Figure 5, the plate resistance of the pentode 21 is extremely high and the condenser 22 is charged by the plate source through the plate load resistor 23. The resultant signal output from the pentode is illustrated in Figure 6. It will be seen from this figure that the amplitude of the signal varies in direct proportion to the spacing between pulses 19 since during the charging intervals the voltage across the condenser 22 increases linearly (or more precisely exponentially) and, therefore, the maximum potential reached by the condenser during a particular charging interval is proportional to the length of time that the pentode 21 remains below plate current cut-off value.

The signals of Figure 6 are applied to the control grid of the triode 24 and the amplified signals therefrom are passed through the audio filter 25 and thence to the audio stages of the receiver.

Although the above has indicated the mode of operation of the device it will perhaps be clearer if a detailed description of that operation is given. The operation of the device is as follows:

The circuit of diode 10 acts as a source of demodulated I. F. and supplies pulse signals.

Tube 11 is normally conducting to a moderate extent because of the zero bias on its grid and its low plate and screen voltages. The input pulses from detector 10 (see Fig. 3) drive tube 11 to cut-off, because of its small grid voltage range. Tube 11 thus serves as a limiter for limiting signals from pulse source 10.

When tube 11 is cut off, the B supply starts to charge condenser 13 through resistor 12. Condenser 13 thus integrates the energy from the B supply source. The time constant of the circuit comprising resistance 12 and condenser 13 is of the order of the length of a typical pulse, i. e., 3 microseconds. Condenser 13 discharges instantly when tube 11 is conducting, and it is thus inactivated as an integrator and restored to its initial condition in response to the presence of a signal in the input of the tube 11.

Tube 14 is overbiased, to the extent that it will only respond when a pulse signal has cut off tube 11, and integration in condenser 13 has continued for about 3 microseconds. When tube 14 conducts it applies a negative pulse to the grid of tube 17 (and incidentally on the plate of tube 16). (See Fig. 4.)

The negative pulse on the grid of tube 17 cuts off its plate current, and produces a positive pulse at its plate terminal. This pulse is transferred to the grid of the tube 16, where it appears across its grid leak. The condenser between the plate of tube 17 and the grid of tube 16 does not have time to discharge through its shunt resistor during this operation, and substantially the entire positive pulse is applied across the grid leak of tube 16. (The R. C. circuit in the common lead between the cathodes of tubes 16 and 17 and ground has a long time constant, and maintains the cathodes at a fixed potential, substantially as a battery would.) Tube 16 now conducts, and its plate current, passing through its plate load resistor, holds its plate potential down to a value of the order of that to which it was driven by the pulse from tube 14. The condenser between the plate of tube 16 and the grid of tube 17 is now gradually charged from the B supply, through the grid leak of tube 17, to a potential equal to the plate current drop in the plate load resistor of tube 16. As the voltage across the condenser rises, the current through the grid resistor of tube 17 falls, and the grid potential of tube 17 rises gradually until it passes the cutoff potential. When this happens, tube 17 conducts, and its plate current flow drops its plate potential. The negative pulse thus generated appears on the grid of tube 16 and cuts off the flow of its plate current, leaving the multivibrator in condition to be triggered again. The plate load of tube 17 is tapped to transmit its output to condenser 20. (See Fig. 5.)

Thus, the full voltage available at the tap on the voltage divider is applied to the condenser 20 for the duration of the multivibrator pulse. Tube 21 is thus rendered conductive for this period, becoming non-conductive again when the multivibrator restores itself to its initial condition, dropping the voltage at the tap point. As soon as tube 21 starts conducting, condenser 22 discharges, and practically the whole B supply voltage is dropped in resistor 23. During the non-conducting period of tube 21, that is, in the interval between multivibrator pulses, condenser 22 charges up substantially linearly through resistor 23. (See Fig. 6.) The resulting triangular signals are supplied to the grid of cathode-loaded amplifier 24, filtered in the low pass audio filter 25, and delivered to the output terminals (see Fig. 6, dashed line).

If an interfering pulse shorter than a signal pulse is applied so as to cut off tube 11, condenser 13 does not charge up enough to fire tube 14, and condenser 13 is instantly discharged at the end of the interfering pulse. If an interfering pulse is long enough to fire tube 14, it will not actuate or otherwise affect the multivibrator while the multivibrator is forming a pulse. If the multivibrator is not forming a pulse when tube 14 fires, it forms a false pulse which will actuate tube 21. Tube 21 will then conduct, and condenser 22 will instantly discharge. Under these conditions condenser 22 will fail to charge up to the full value corresponding to the full inter-pulse time interval because before it gets to that value it will be discharged, and it will start to charge again following the false pulse. It will again be prematurely discharged by the next true pulse, and the two signals of reduced intensity will represent a deficiency in the series of peaks being transmitted.

The only case where an excess in the output signal of Fig. 6 can be caused by a false pulse is when the false pulse is of sufficient magnitude to cut off tube 11, of sufficient duration, when applied to condenser 13, to fire tube 14, and so late after the last previous true pulse that the multivibrator is fired by the false pulse, and therefore fails to respond to the next true pulse. In this case tube 21 is cut off for more than the normal inter-pulse time, and condenser 22 is charged (exponentially) to an unduly high value.

From the above description of the circuit and its operation, it will be clear that the signal pulse must be sufficiently higher than the peak noise level to fire the pick-off tube or pentode 14 and also clear that any noise introduced into the output results only from variations in the firing time of the multivibrator 16—17. Any such noise can be reduced to a minimum by utilizing very short signal pulses. In practice pulses of from one-half to one microsecond in duration have been successfully used. Likewise, interference due to thermal noise affects only the firing time of the multivibrator. Hence, the shorter the signal pulse the less the possible variation in firing time and the less the thermal noise. Limiting factors are methods of obtaining short pulses and the increased intermediate frequency bandwidths required for the shorter pulses. As before, in practice pulses from one-half to one microsecond have been successfully used, the one-half microsecond pulse being about the lowest limit which can be secured.

In connection with the shortness of the pulse it may be mentioned that radar interference will affect the firing time of the multivibrator only when the radar pulse coincides with the signal pulse. The chances of this occurring for a system in which the duty cycle is high, say on the order of 100 or more, are approximately 1:100 or whatever the duty cycle happens to be.

The fidelity of a detector system such as the one of my invention is limited only by the center value of the pulse repetition frequency. In general, the pulse repetition frequency must be at least two and one-half times the maximum modulating frequency, or more specifically, the minimum pulse repetition center frequency miuus the maximum negative deviation in frequency must be sufficiently greater than twice the maximum modulating frequency so that the low pass filter will remove the pulse repetition frequency components in the integrated sawtooth wave and still prevent speech inversion.

Thus, for fidelity comparable to that provided by commercial telephone services (for example, 200 to 2500 cycles per second) center frequencies of from 7 to 20 kc. have been satisfactorily used. For higher fidelities the center pulse repetition frequency must be increased, maintaining the value at approximately two and one-half times the maximum modulation frequency.

The characteristics of the detector system described are such that the signal-to-noise ratio changes from 0 to over 100 upon a 3 decibel change in signal level. The pulse repetition frequency system has a threshold sensitivity determined by that signal level necessary to produce a pulse height about twice the root-mean square value of the thermal noise. An additional 3db of signal locks the detector to the signal and produces a signal-to-noise ratio of over 100 which remains constant for all higher signal levels.

In order to discriminate between pulses on the basis of width alone, it is necessary to limit the signal pulse amplitude at the threshold value. Of course, this sets the signal-to-noise ratio for all signal levels but by sacrificing a few decibels at threshold sensitivity it is possible to raise the signal-to-noise ratio to several hundred for all signal levels above the new threshold. Consequently, it is possible with the system to produce very high signal-to-noise levels such as result with ordinary amplitlude modulated and frequency modulated systems. I have found, however, that for the system above described and for all practical purposes, considering the low fidelity requirements, a signal-to-noise ratio of about 100 is adequate.

Because of the limiting action of the pentode 11, as heretofore described, together with the overload characteristics of the intermediate frequency amplifier, there is no necessity for automatic volume control. The intermediate frequency circuits must, however, be designed with very short grid time constants in order to prevent the intermediate frequency amplifier from "backing off" in the presence of high overload signals, whether signal or interference.

There are many possible ways of obtaining the firing characteristics of the non-oscillating multivibrator used in the system and described hereinabove. For example, thyratrons could be utilized together with circuits similar to those of conventional sawtooth oscillators, or blocking oscillators might be employed. In addition, there are a number of integrator circuits which might be utilized and, similarly, a number of pulse width discriminators.

Thus, while I have described a preferred embodiment of my invention, I do not desire to be limited to the description which is given herein solely for purposes of illustration, but rather to be limited only by the appended claims.

What is claimed is:

1. In a detector of pulse repetition frequency modulated signals, in combination, means for limiting the amplitude of received frequency modulated signals, means for eliminating signals of less than predetermined duration, means for producing equal interval equal amplitude signals spaced in accordance with received signals exceeding the predetermined duration, and means for integrating said spaced equal interval signals to produce signals containing the original modulation of said pulse repetition frequency modulated signals.

2. In a detector of pulse repetition frequency modulated signals, in combination, means for limiting the amplitude of received frequency modulated signals, means for eliminating signals of less than predetermined duration, means for producing equal interval equal amplitude signals spaced in accordance with received signals exceeding the predetermined duration, means for integrating said spaced equal interval signals to produce signals containing the modulation of said pulse repetition frequency modulated signals, and a filter system for passing only the modulation components of said last mentioned signals.

3. In a detector of pulse repetition frequency modulated signals, in combination, means for limiting the amplitude of received frequency modulated signals, means for eliminating signals of less than predetermined duration, a multivibrator for producing equal interval equal amplitude signals, said multivibrator being fired in accordance with the received signals exceeding the predetermined duration, and means for integrating said output signals from said multivibrator to produce signals containing the original modulation of said pulse repetition frequency modulated signals.

4. In a detector of pulse repetition frequency modulated signals, in combination, means for limiting the amplitude of received frequency modulated signals, means for eliminating signals of less than predetermined duration, a multivibrator for producing equal interval equal amplitude signals, said multivibrator being fired in accordance with the received signals exceeding the predetermined duration, and a pentode biased to cut off said output from said multivibrator being applied to said pentode, said pentode integrating said multivibrator output signals and producing signals containing the original modulation of said pulse repetition frequency modulated signals.

5. In a detector of pulse repetition frequency modulated signals, in combination, means for limiting the amplitude of received frequency modulated signals, means for eliminating signals of less than predetermined duration, a multivibrator for producing equal interval equal amplitude signals, said multivibrator being fired in accordance with the received signals exceeding the predetermined duration, a pentode biased to cut off, said output from said multivibrator being applied to said pentode, said pentode integrating said multivibrator output signals and producing signals containing the original modulation of said pulse repetition frequency modulated signals, and a filter system for passing only the modulation components of said last mentioned signals.

6. In a detector of pulse repetition frequency modulated signals, in combination, a pentode tube having its input circuit adjusted to limit the amplitude of received frequency modulated signals and its plate circuit adjusted to eliminate signals of less than predetermined duration, a multivibrator adjusted to go through a single cycle when fired, a pick-off tube in the output circuit of said pentode, said pick-off tube serving to apply output signals from said pentode to said multivibrator, and means in the output circuit of said multivibrator to integrate the output thereof to produce signals containing the original modulation.

7. In a detector of pulse repetition frequency modulated signals, in combination, a pentode tube having its input circuit adjusted to limit the amplitude of received frequency modulated signals and its plate circuit adjusted to eliminate signals of less than predetermined duration, a multivibrator adjusted to go through a single cycle when fired, a pick-off tube in the output circuit of said pentode, said pick-off tube serving to apply output signals from said pentode to said multivibrator, means in the output circuit of said multivibrator to integrate the output thereof to produce signals containing the original modulation, and a filter system for passing only the modulation components of said last mentioned signals.

WILLIAM H. FORSTER.

REFERENCES CITED

The following references are of record in the file of this patent:

UNITED STATES PATENTS

| Number | Name | Date |
|---|---|---|
| 2,061,734 | Kell | Nov. 24, 1936 |
| 2,113,214 | Luck | Apr. 5, 1938 |
| 2,141,343 | Campbell | Dec. 27, 1938 |
| 2,153,202 | Nichols | Apr. 4, 1939 |
| 2,181,309 | Andrieu | Nov. 28, 1939 |
| 2,224,134 | Blumlein | Dec. 10, 1940 |
| 2,283,415 | Cox | May 19, 1942 |
| 2,286,377 | Roberts | June 16, 1942 |
| 2,323,596 | Hansell | July 6, 1943 |
| 2,359,447 | Seeley | Oct. 3, 1944 |
| 2,379,899 | Hansell | July 10, 1945 |
| 2,391,776 | Fredendall | Dec. 25, 1945 |
| 2,398,097 | Kent | Apr. 9, 1946 |
| 2,413,023 | Young, Jr. | Dec. 24, 1946 |
| 2,416,305 | Grieg | Feb. 25, 1947 |